United States Patent [19]

Blaha

[11] 3,918,330
[45] Nov. 11, 1975

[54] INSULATED WIRE CUTTING AND STRIPPING APPARATUS

[75] Inventor: Gerald E. Blaha, Waukesha, Wis.

[73] Assignee: Artos Engineering Company, New Berlin, Wis.

[22] Filed: Nov. 18, 1974

[21] Appl. No.: 524,395

[52] U.S. Cl. ................................................ 81/9.51
[51] Int. Cl.² ........................................ H02G 1/12
[58] Field of Search .................................... 81/9.51

[56] References Cited
UNITED STATES PATENTS

| | | | |
|---|---|---|---|
| 2,497,112 | 2/1950 | Andren | 81/9.51 |
| 2,680,394 | 6/1954 | Andren | 81/9.51 |
| 2,718,802 | 9/1955 | Cook | 81/9.51 |
| 2,756,619 | 7/1956 | Scharf | 81/9.51 |
| 3,029,494 | 4/1962 | Andren | 81/9.51 |
| 3,530,746 | 9/1970 | Gudmestad | 81/9.51 |

Primary Examiner—Al Lawrence Smith
Assistant Examiner—Roscoe V. Parker
Attorney, Agent, or Firm—James E. Nilles

[57] ABSTRACT

Insulated electrical wires are successively advanced sidewise by an intermittently operated endless conveyor, and a wire cutting and stripping apparatus is provided at least at one side of the conveyor for trimming and stripping successive wires during periods of momentary standstill of the conveyor. The wire cutting and stripping apparatus has a reciprocable tool slide and complementary pairs of wire cutting and insulation stripping blades thereon. One of each pair of blades is rigidly mounted on the tool slide, and the other blade of each pair is reciprocable so that it is necessary to move only the reciprocable blades in order to cut the wire and score its insulation. A telescopic, springloaded connecting rod between a rotating crank shaft and the reciprocable cutting and stripping blades provides a dwell period during which the tool slide is retracted without opening the stripping blades. A knock-out mechanism dislodges the strippings from the rigidly mounted blades as well as from the reciprocably mounted blades.

12 Claims, 20 Drawing Figures

INSULATED WIRE CUTTING AND STRIPPING APPARATUS

The invention relates to the stripping of insulation from electrical wires at one or both ends as needed for the attachment of a terminal thereto.

BACKGROUND OF THE INVENTION

Apparatus have heretofore been developed for trimming and stripping electrical wires which are successively advanced sidewise by an intermittently operated endless conveyor. In this connection reference may be had to U.S. Pat. No. 3,530,746, dated Sept. 29, 1970 and issued to R. Gudmestad for Wire Stripping Apparatus. As disclosed in that patent a pair of laterally spaced conveyor chains are provided with wire gripping clamps by means of which successive precut wires are supported near their opposite ends. End portions of the successive wires overhang the gripping clamps of the conveyor and are engaged by trimming and stripping apparatus during periods of momentary standstill of the conveyor. The trimming and stripping apparatus at the opposite sides of the conveyor are provided, respectively, with a reciprocable tool slide mounting a complementary pair of wire cutting blades and a complementary pair of insulation stripping blades, both blades of each pair being reciprocable on the tool slide, into closed and open positions.

The provision of complementary, reciprocable blade assemblies at opposite sides, respectively, of a wire and the closing and opening of these blade assemblies by simultaneously reciprocating the blades at opposite sides of the wire, as contemplated by the mentioned Gudmestad patent, is a common expedient which is well known in the art. It has the advantage that strippings, that is, sleeves of stripped insulation which remain jammed between the cutting and stripping blades after the cutting and stripping operations may be dislodged in a very simple and efficient manner by stationary knock-out blades as disclosed, for instance, in U.S. Pat. No. 2,680,394, dated June 8, 1954 and issued to K. H. Andren for Wire Cutting and Stripping Machine. However, the mechanism for simultaneously reciprocating the blades at opposite sides of the wire involves a rather complicated and expensive assembly of intricate parts, especially, when the blade assemblies, as in the mentioned Gudnestad patent, are not only moved back and forth at opposite sides of the indexed wire but where both blade assemblies are also moved bodily toward and away from a wire conveying mechanism.

SUMMARY OR THE INVENTION OF

Generally, the present invention provides an improved wire cutting and stripping apparatus for use in connection with an intermittently operable wire conveying mechanism.

More specifically, the invention provides an apparatus of the mentioned character wherein wire cutting and insulation stripping blades are arranged in such a manner that a complementary pair of wire cutting blades and a complementary pair of wire stripping blades may be closed and opened by reciprocating only one blade of each pair at one side of the indexed wire while the other blade of each pair at the other side of the wire is kept from changing its position transversely of the wire.

The invention further provides an improved actuating mechanism which closes and opens the wire cutting and insulation stripping blades and which also accommodates back and forth shifting of the entire blade mounting towards and away from the wire conveying mechanism lengthwise of the indexed wire.

The invention further provides an improved blade actuating mechanism of the mentioned character which includes a telescopic spring loaded connecting rod between a rotary crank shaft and the reciprocable cutting and stripping blades whereby the pair of stripping blades may be kept closed for stripping while the crank shaft continues to rotate.

The invention further provides a mechanism for tightening the wire gripping clamp on the conveyor in engagement with the indexed wire so that the stripping pull will be taken up by the tightened conveyor clamp and no additional clamping device for the indexed wire will be needed.

The invention further provides means for placing a wire sidewise into a centered position between the pairs of open wire cutting and insulation stripping blades, such means comprising a ramp which is adjustable to wire guiding and non-guiding positions, and a pair of pivoted centering fingers which sweep the indexed wire into its centered position.

The invention further provides an improved strippings knock-out mechanism which dislodges jammed insulation strippings from stationary as well as from reciprocable wire cutting and insulation stripping blade assemblies.

DRAWINGS

The foregoing and other features and advantages of the invention will become more fully apparent as this specification proceeds with reference to the accompanying drawings wherein.

DETAILED DESCRIPTION

Figure 1:
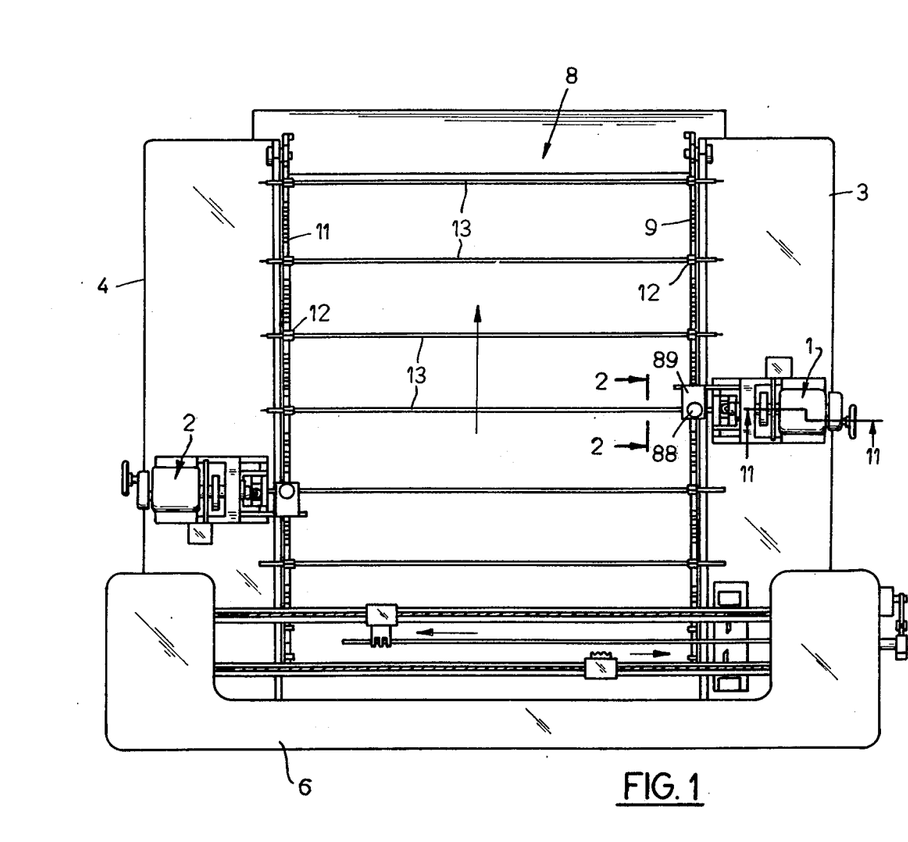
FIG. 1 is a plan view of an equipment assembly including two wire cutting and stripping apparatus embodying the invention.

In FIG. 1 wire cutting and stripping apparatus 1 and 2 are mounted on side frames 3 and 4 of a wire length measuring and cutting apparatus generally designated by the reference character 6. The wire length measuring and cutting apparatus 6 operates in accordance with well established principles to successively draw insulated electrical wire from a supply reel 7, cut a predetermined length of the wire from the stock on the supply reel 7 and deposit the cut off wire lengths on an intermittently operated conveying mechanism 8. The conveying mechanism comprises two endless conveyor chains 9 and 11, and each of the conveyor chains is provided with a series of wire gripping clamps 12, one of the clamps on the conveyor chain 9 being shown in detail in FIG. 2. The clamps 12 on the conveyor chain 9 register with the clamps 12 on the conveyor chain 11, and a cut off wire length is deposited into a registering pair of wire gripping clamps 12 when a wire length has been cut off from stock and a pair of registering wire gripping clamps 12 has been moved into a position below the cut off wire lengths, with the jaws of the wire clamps open. Automatic control mechanism, not shown, then closes the wire gripping clamps 12 upon the cut off wire length and the conveying mechanism is then indexed to advance the cut off wire lengths sidewise one step towards the discharge end of the conveying mechanism 8. FIG. 1 shows the conveying mechanism 8 in a condition where a series of cut off wire lengths 13 are supported parallel to each other on the conveyor chains 9 and 11.

Figure 2:
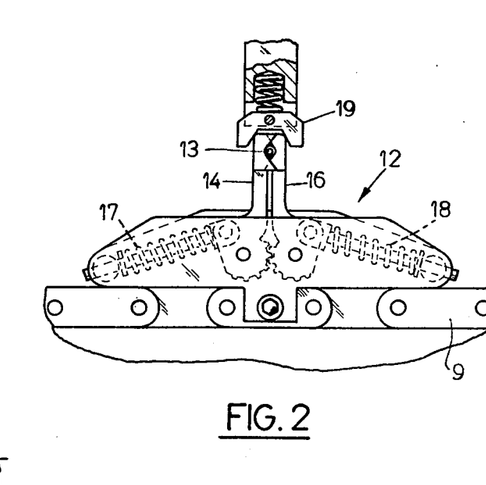
FIG. 2 is an elevational view, partly in section, on line 2—2 of FIG. 1.

Each wire gripping clamp 12 comprises a pair of complementary wire gripping jaws 14 and 16, as shown in FIG. 2, which are swingable into and out of engagement with the cut off wire lengths 13 by a suitable mechanism, not shown, and which are urged into their wire engaging positions by coil springs 17 and 18. A straddle block 19 is provided, as will be explained more fully hereinbelow, to tighten the grip of the jaws 14 and 16 upon the wire while its overhanging end is being stripped by the adjacent wire cutting and stripping apparatus. After a wire 13 has been stripped by the apparatus 1 and a preceding wire 13 has been stripped by the apparatus 2 the next advance step of the conveying mechanism 8 brings the ends of new wires 13 into engagement with the wire cutting and insulation stripping apparatus 1 and 2 for trimming them and stripping insulation therefrom. During successive advance steps of conveying mechanism a wire 13 will thus present a trimmed and stripped end portion at the opposite sides of the conveying mechanism, and the side frames 3 and 4 of the wire length measuring and cutting apparatus 6 may be provided with supplemental equipment, not shown, for applying terminals to the stripped ends of each wire length 13.

Figures 3, 4:
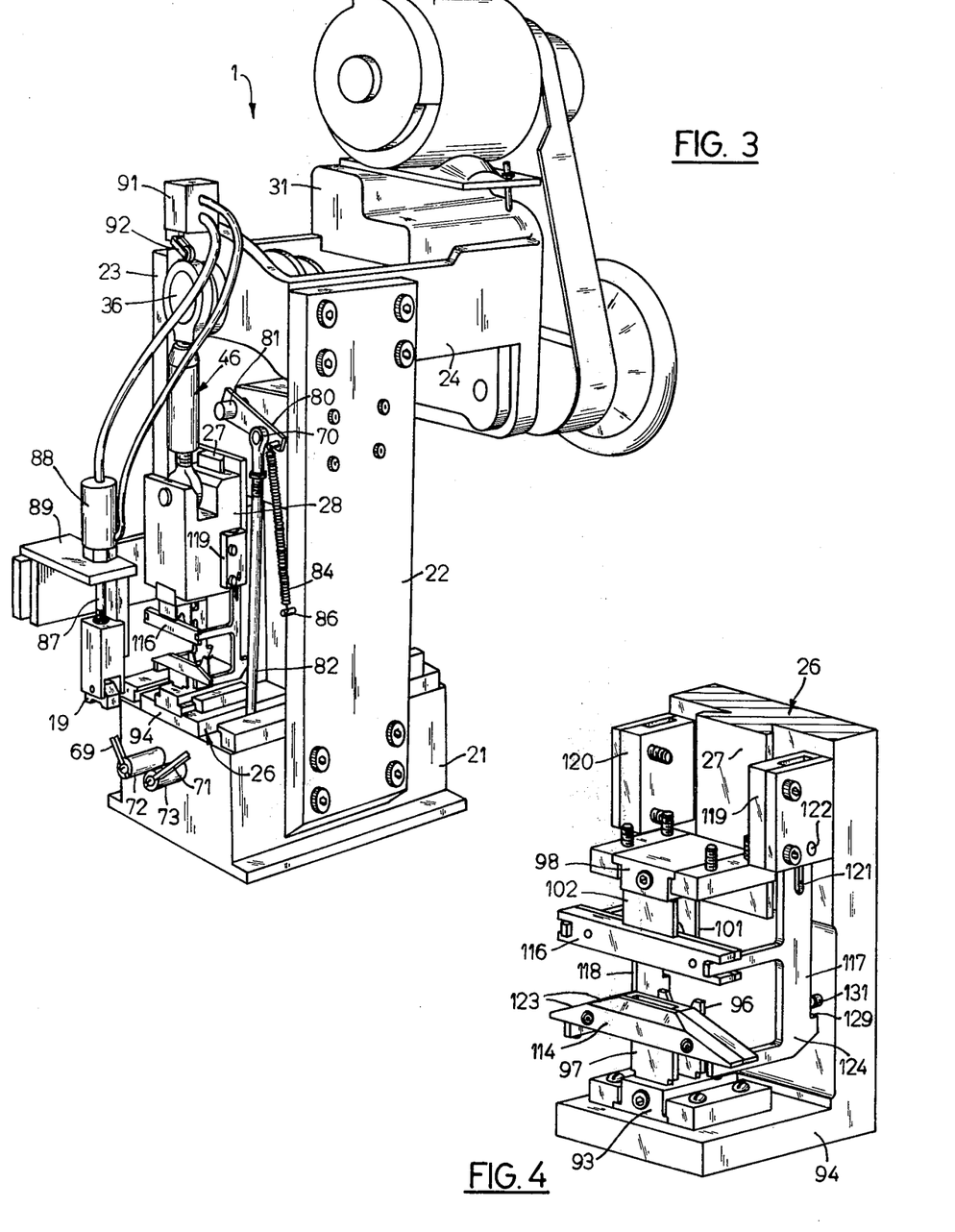
FIG. 3 is a perspective, three quarter front view of an apparatus embodying the invention, parts being broken away for clarification.
FIG. 4 is an enlarged perspective view of part of the apparatus shown in FIG. 3.

FIG. 3 shows the wire cutting and insulation stripping apparatus which in FIG. 1 is generally designated by the reference number 1 and which engages the overhanging portion of an indexed wire at the outer side of the conveyor chain 9. The wire cutting and insulation stripping apparatus which is generally designated in FIG. 1 by the reference number 2 and which engages the overhanging portion of an indexed wire at the outer side of the conveyor chain 11 is a duplicate of the apparatus 1. Therefore, in the following only the apparatus 1 will be described in detail.

A main frame of the apparatus shown in FIG. 3 comprises a base 21, parallel uprights 22, 23 (FIG. 7) and a top section 24 rigidly secured between the uprights 22 and 23. On top of the base 21 and between the uprights 22, 23 a tool slide 26 is reciprocably mounted for movement into a horizontal position next to the outer side of the conveyor chain 9, and for movement into a retracted position spaced from the outer side of the conveyor chain 9. The tool slide 26 has an upright dovetailed ridge 27 (FIG. 6) on which a crosshead 28 is mounted for up and down movement relative to the tool slide and for back and forth movement in unison with the tool slide relative to the conveying mechanism 8.

Figure 11:
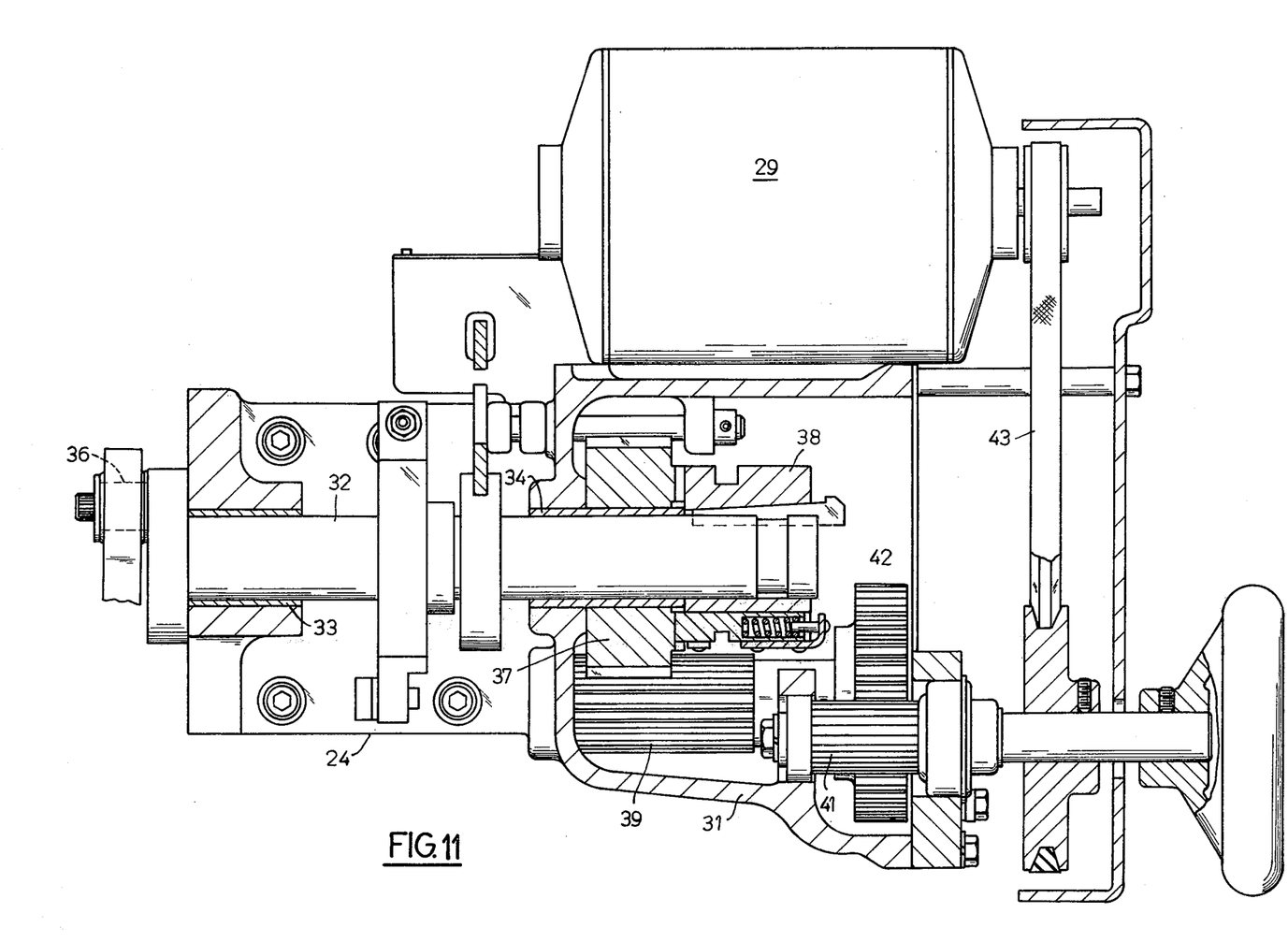
FIG. 11 is a sectional view of a power transmitting mechanism, the view of FIG. 11 being taken generally on line 11—11 of FIG. 1.

Power for reciprocating the tool slide 26 back and forth relative to the conveying mechanism 8, and for reciprocating the crosshead 28 up and down on the tool slide 26 is derived from a continuously running motor 29 (FIG. 3) which is mounted on top of a gear housing 31 connected to the top section 24 of the main frame. As shown in FIG. 11, a horizontal crank shaft 32 is rotatably mounted in bearings 33, 34 of the housing 31 and has an external crank pin 36 (FIG. 8) above the crosshead 28. A loose gear 37 (FIG. 11) on the crank shaft 32 is connectable with and disconnectable from the crank shaft 32 by a one-revolution clutch 38 of conventional construction. Speed reducing gearing is operatively interposed between the gear 37 and the motor 29 and comprises a countershaft pinion 39 in mesh with the gear 37, a drive shaft pinion 41 in mesh with a counter shaft gear 42, and a V-belt drive 43 from the motor 29 to the drive shaft pinion 41.

Figure 8:
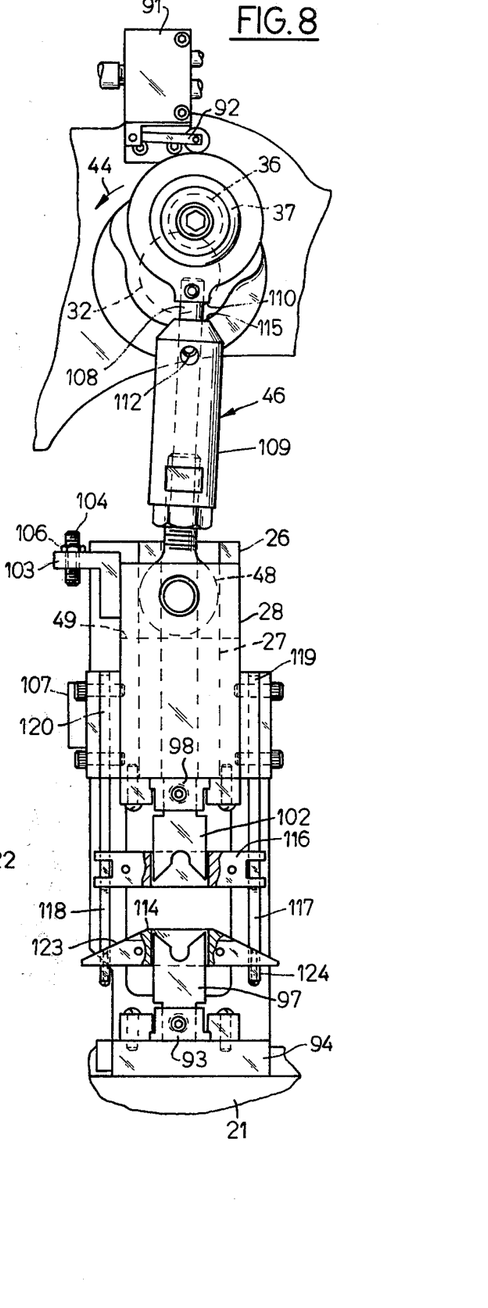
FIG. 8 is a partial, elevational front view of the apparatus shown in FIG. 3.

In the disengaged condition of the one-revolution clutch 38 the crank shaft 32 is in a rotatively adjusted position as shown in FIG. 8 in which the crank pin 36 is near its maximum height above the axis of rotation of the crank shaft. Engagement of the one-revolution clutch 38 causes rotation of the crank pin 36 in the direction of arrow 44 in FIG. 8, and an electrical control circuit, not shown, includes a solenoid which will trigger the one-revolution clutch 38 in timed relation to the wire conveying mechanism 8, so that the crank shaft 32 may complete one full revolution during each period of temporary standstill of the conveying mechanism.

Figures 5, 6:
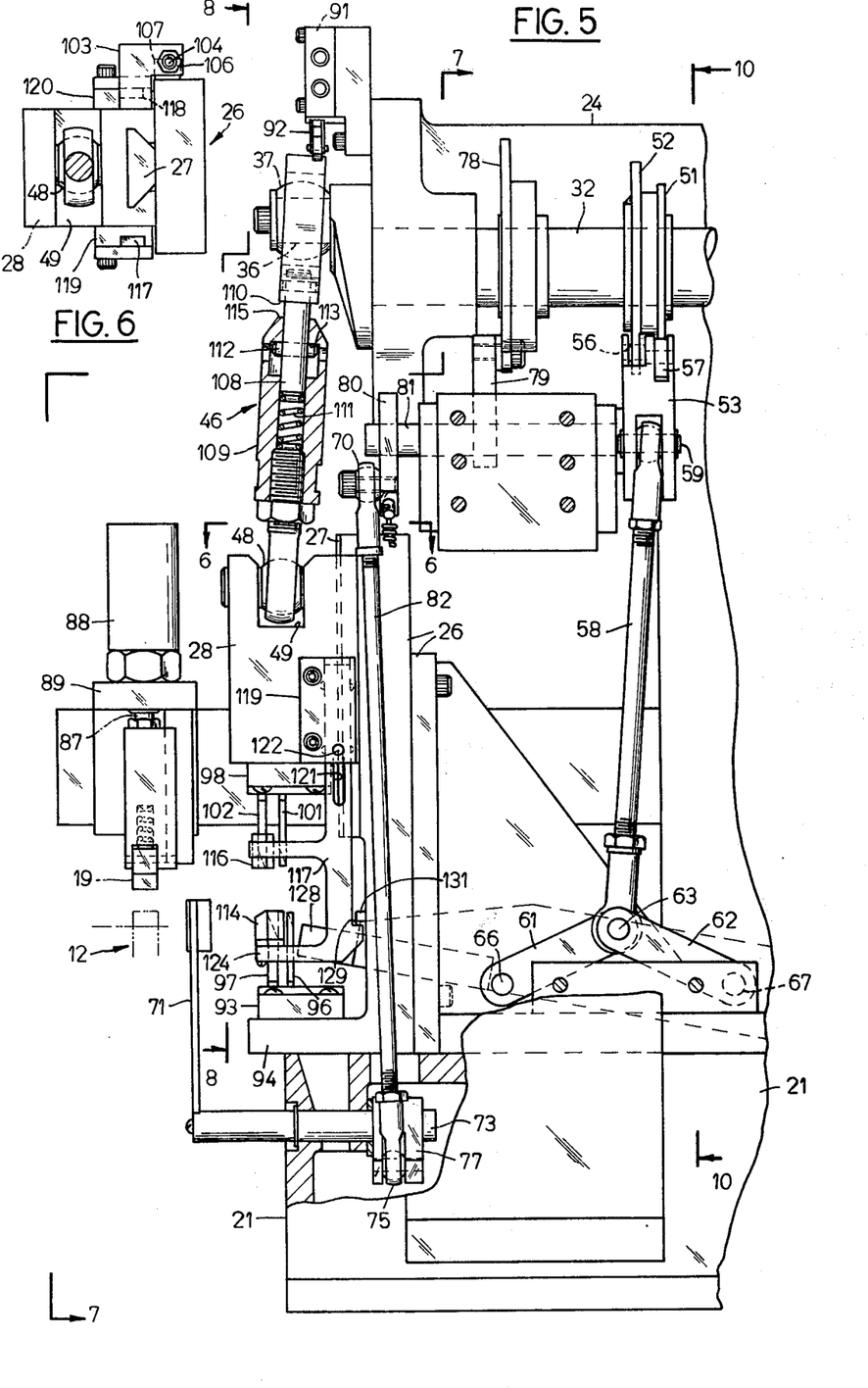
FIG. 5 is a partial, elevational view of the right side of the apparatus shown in FIG. 3 with parts broken away and shown in section.
FIG. 6 is a section on line 6—6 of FIG. 5.
Figure 9:
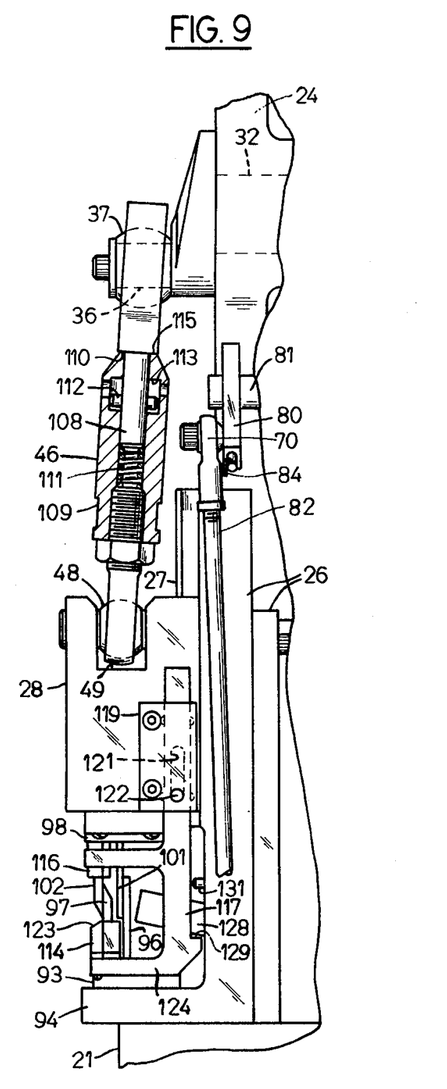
FIG. 9 is a side view of FIG. 8, partly in section, with parts in a different position of adjustment than in FIG. 8.

A telescopically contractable and expandable spring loaded link 46 (FIG. 5) is connected at one end to the crank pin 36 by a ball and socket joint 37, and the other end of the link 46 has a ball and socket connection 48 with the crosshead 28 within a vertical recess 49 at the upper end of the latter. Rotation of the crank shaft 32 through one revolution in the direction of arrow 44 (FIG. 8) first pushes the crosshead 28 on the tool slide 26 from the raised position in which it is shown in FIG. 5 to the lowered position in which it is shown in FIG. 9, and it then lifts the crosshead 28 back to its FIG. 5 position where it remains during each period of advance movement of the wire conveying mechanism 8.

Concurrently with the rotation of the crank shaft 32 through one full revolution in the direction of arrow 44 from its FIG. 8 position the tool slide 26 together with the crosshead 28 thereon is reciprocated transversely of the conveyor chain 9. More particularly, provisions are made to maintain the tool slide 26 in its projected position next to the conveyor chain 9 while the crosshead 28 is pushed from its raised FIG. 5 position to its lowered FIG. 9 position; further, to withdraw the tool slide from its projected position to a retracted position away from the conveyor chain 9 while the crosshead 28 is in its lowered FIG. 9 position; further, to thereafter restore the crosshead 28 from its lowered FIG. 9 position to its raised FIG. 5 position, and finally to restore the tool slide to its projected position with the crosshead 28 thereon in its raised FIG. 5 position.

The necessary mechanism to reciprocate the tool slide 26 in timed relation to the crosshead 28 as outlined above, comprises a pair of conjugated cam discs 51, 52 (FIG. 5) on the crank shaft 32; a rocker 53 (FIG. 10) pivoted on the main frame by means of a fixed pivot pin 54 and having cam follower rollers 56 and 57 in cooperative engagement with the cam discs 51 and 52, respectively; a link 58 having a ball and socket connection 59 with the rocker 53, and a pair of toggle links 61, 62 connecting the lower end of the link 58 with the base 21 of the main frame and with the tool slide 26, respectively. A center joint for the toggle links 61, 62 comprises a cross pin 63 (FIG. 10) which has a ball and socket connection 64 with the lower end of the link 58, and pivot pins 66 and 67 for the toggle links 61, 62 are mounted, respectively, on the tool slide 26 and the frame base 21, so as to reciprocate the tool slide 26 relative to the frame base 21 by up and down movement of the link 58.

Figure 7:
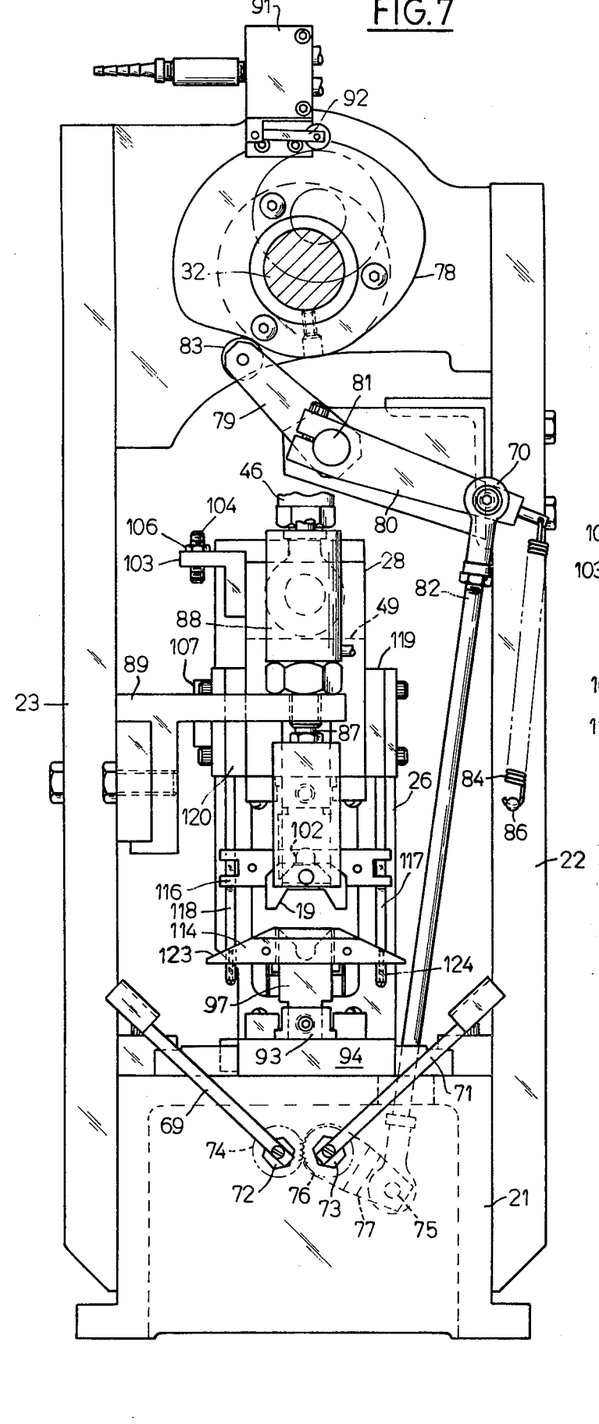
FIG. 7 is an elevational view on line 7—7 of FIG. 5.

Means are also provided to center the overhanging end of an indexed wire laterally on the tool slide 26. Such wire centering means comprise, as shown in FIG. 7, a pair of oscillating fingers 69 and 71 which are secured, respectively, to pivot shafts 72, 73 on the frame base 21 for swinging movement toward and away from each other.

A pinion 74 on the pivot shaft 72 for the centering finger 69 meshes with a pinion 76 on the pivot shaft 73 for the centering finger 71, and a rocker arm 77 is connected to the shaft 73 whereby the centering fingers 69 and 71 may be swung toward and away from each other by back and forth swinging movement of the rocker arm 77 about the pivot axis of the pivot shaft 73.

The necessary mechanism for swinging the centering fingers 69, 71 into and out of their wire centering positions comprises a cam disc 78 (FIG. 7) on the crank shaft 32; a lever assembly 79, 80 which is pivoted on the main frame by means of a pin 81; and a connecting link 82 between the lever 80 and the rocker arm 77 for the pinion shaft 73. The lever 79 has a cam following roller 83 in engagement with the cam disc 78, and a coil spring 84 (FIG. 7) is anchored at one end to the side member 22 of the main frame by a pin 86 and has its other end connected to the lever 80 whereby the cam following roller 83 will be urged into engagement with the cam disc 78 by the contracting pull of the coil spring 84. The upper and lower ends of the link 82 are connected to the lever 80 and to the rocker arm 77 by ball and socket joints 70 and 75 (FIG. 7), respectively.

The hereinbefore mentioned straddle block 19 (FIG. 2) for tightening the jaws 14 and 16 into engagement with an indexed wire 13 is connected, as shown in FIG. 3, to the piston rod 87 of a pneumatic cylinder 88. A supporting bracket 89 for the cylinder 88 is mounted on the side member 23 of the main frame so as to position the straddle block 19 for up and down movement into and out of engagement with the underlying jaws 14 and 16 of an indexed conveyor clamp 12 opposite to the wire cutting and insulation stripping apparatus 1, as shown in FIG. 1. A pneumatic circuit for expanding and contracting the pneumatic cylinder 88 includes a valve mechanism 91 (FIG. 3) which is controlled by an actuating arm 92 in cooperative engagement with the upper end of the connecting rod 46. When the crank pin 36 starts rotating in the direction of arrow 44 in FIG. 8, the actuating arm 92 controls the valve 91, so as to expand the cylinder 88, and as a result the straddle block is urged into engagement with an underlying pair of wire clamping jaws 14 and 16. The pneumatic pressure urging the straddle block into tightening engagement with the underlying wire gripping jaws 14 and 16 is maintained during the time period when the tool slide 26 is retracted for a stripping stroke, and thereafter the pneumatic actuating cylinder 88 for the staddle block 19 is contracted to raise the straddle block 19 and thereby clear the gripping jaws 14 and 16 for advance movement of the conveying mechanism 8.

The wire cutting and insulation stripping operations are performed by means of a stationary blade assembly on the tool slide 26 and a reciprocable blade assembly on the crosshead 28. The stationary blade assembly comprises a fixture 93 (FIG. 4) clamped to a sole plate 94 of the tool slide 26; and two upstanding blades 96 and 97 mounted in the fixture 93, the blade 96 being a wire cutting blade of conventional construction, and the blade 97 being an insulation stripping blade of conventional construction. The reciprocable blade assembly, on the other hand, comprises a fixture 98 (FIG. 8) clamped to the underside of the crosshead 28 and two depending blades 101 and 102 (FIG. 4) mounted on the fixture 98, the blade 101 being a conventional wire cutting blade complementary to the wire cutting blade 96, and the blade 102 being a conventional insulation stripping blade complementary to the insulation stripping blade 97.

In the condition of the apparatus as shown in FIG. 5 the pair of wire cutting blades 96, 101, as well as the pair of insulation stripping blades 97, 102 are open, and in the condition of the apparatus as shown in FIG. 9 the pair of wire cutting blades 96, 101, as well as the pair of insulation stripping blades are closed. In order to determine the closed position of the wire cutting and insulation stripping blades a bracket 103 (FIG. 8) is rigidly secured to the cross head 28 and mounts an up and down adjustable set screw 104 which is locked in adjusted position by a jam nut 106. A stop block 107 is mounted on the tool slide 26 in the path of up and down movement of the set screw 104, so as to determine the closed condition of the wire cutting and insulation stripping blades by abutment of the set screw 104 with the stop block 107.

Up and down movement of the reciprocable blade assembly 98, 101 and 102 relative to the stationary blade assembly 93, 96 and 97 is effected by one revolution of the crank shaft 32 from its FIG. 8 starting position in the direction of arrow 44. While the crank pin 36 is approximately at its top dead center position as shown in FIG. 8 the telescopic link 46 is in its maximum expanded position as shown in FIG. 5. That is, the upper section 108, and the lower section 109 of the telescopic link 46 are axially urged apart by a coil spring 111, and a cross pin 112 on the upper link section 108 bears against an internal shoulder 113 of the lower link section 109 to take up the expanding thrust of the compressed spring 111. The contracted length of the link 46 is determined by abutment of a shoulder 110 on the upper link section with a shoulder 115 on the lower link section 109.

Orbital movement of the crank pin 36 from its FIG. 8 position in the direction of arrow 44 lowers the reciprocable wire cutting blade 101 into engagement with the underlying end of an indexed wire 13. As the crank pin 36 continues its orbital movement the link 46 will contract due to the cutting resistance encountered by the reciprocable wire cutting blade 101, and when the shoulder 110 (FIG. 5) of the upper link section bottoms on the shoulder 115 of the lower link section, a strong downward thrust will be exerted upon the crosshead 28 by the contracted link 46. The ensuing downward movement of the wire cutting blade 101 will cut the wire and at the same time the wire stripping blades 97, 102 will cut to the desired depth into the end of the wire projecting from the conveyor chain 9.

When the crank pin 36 arrives at its bottom dead center position, the set screw 104 (FIG. 8) engages the stop block 107 and the telescopic link 46 will be in its contracted condition. As the crank pin 36 continues its orbital movement through its bottom dead center position without interruption the top section 108 of the telescopic link will rise while the crosshead 28 remains in its blade closing position due to the pressure of the compressed coil spring 111. Only after the crank pin 36 has moved upward a sufficient distance from its bottom dead center position to permit expansion of the telescopic link 46 to its fully extended length will the stripping blades 97, 102 begin to open. The delay of the lower link section 109 to follow the upward movement of the top section 108 provides a dwell period during which the stripping blades remain closed and during which the tool slide 26 is withdrawn from its projected to its retracted position and thereby strips a short sleeve of insulation from the end of an indexed wire 13.

The telescopic link 46 also accommodates variations of the center distance between the ball and socket joints 37 and 48 which are caused by the back and forth movement of the tool slide 26 between its projected and retracted positions. Such variations, however, are very small and negligible insofar as keeping the stripping blades closed during the dwell period is concerned.

After a stripping stroke of the tool slide has been completed the stripped off sleeve of insulation remains jammed between one of the wire cutting blades and one of the insulation stripping blades. In operation, it has been found quite unpredictable whether the stripped insulation sleeve will stay in the stationary blade assembly while the reciprocable blade assembly moves upward, or whether it will stay in the reciprocable blade assembly during upward movement of the latter. During some operating cycles the stripped sleeve may stay in the stationary blade assembly, and during others it may stay in the reciprocable blade assembly.

The herein disclosed wire cutting and insulation stripping apparatus incorporates a strippings knock-out mechanism which will automatically dislodge a stripped insulation sleeve from the stationary blade assembly as well as from the reciprocable blade assembly upon upward movement of the reciprocable blade assembly from the stationary blade assembly. Such strippings knock-out mechanism comprises a generally trapezoidal lower cross bar 114 (FIG. 4); a generally rectangular upper cross bar 116; a three pronged side member 117 (FIG. 4) extending vertically at one side of the crosshead 28 (FIG. 8); and a three pronged side member 118 which is a duplicate of the side member 117 and located at the other side of the crosshead 28. The cross bars 114, 116 and side members 117, 118 are suitably interconnected to form an up and down movable knock-out frame floatingly depending from the crosshead 28. An upright prong of the side member 117 is guided in a vertically slotted pad 119 (FIG. 9) on one side of the crosshead 28, and an upright prong of the side member 118 (FIG. 8) is similarly guided in a vertically slotted pad 120 on the other side of the crosshead 28. A slot 121 (FIG. 9) in the upright prong of the side member 117 and a pin 122 on the crosshead 28 provide a lost motion connection between the latter and the side member 117. A similar lost motion connection between the crosshead 28 and the side member 118 of the knock-out frame is provided by a slot and pin (not shown) corresponding to the slot 121 and pin 122.

As shown in FIG. 8, the trapezoidal lower cross bar 114 of the knock-out frame has a vertical through passage accommodating the stationary stripping blade 97, and the upper cross bar 116 has a vertical through passage accommodating the stripping blade 102 of the reciprocable blade assembly. The portion of the lower cross bar 116 between the stationary blades 96, 97 provides a knock-out member for a stripped insulation sleeve which is jammed between the stationary blades 96, 97; and the portion of the upper cross bar 116 between the blades 101 and 102 provides a knock-out member for a stripped insulation sleeve which is jammed between the blades 101, 102 of the reciprocable blade assembly.

Figure 12:
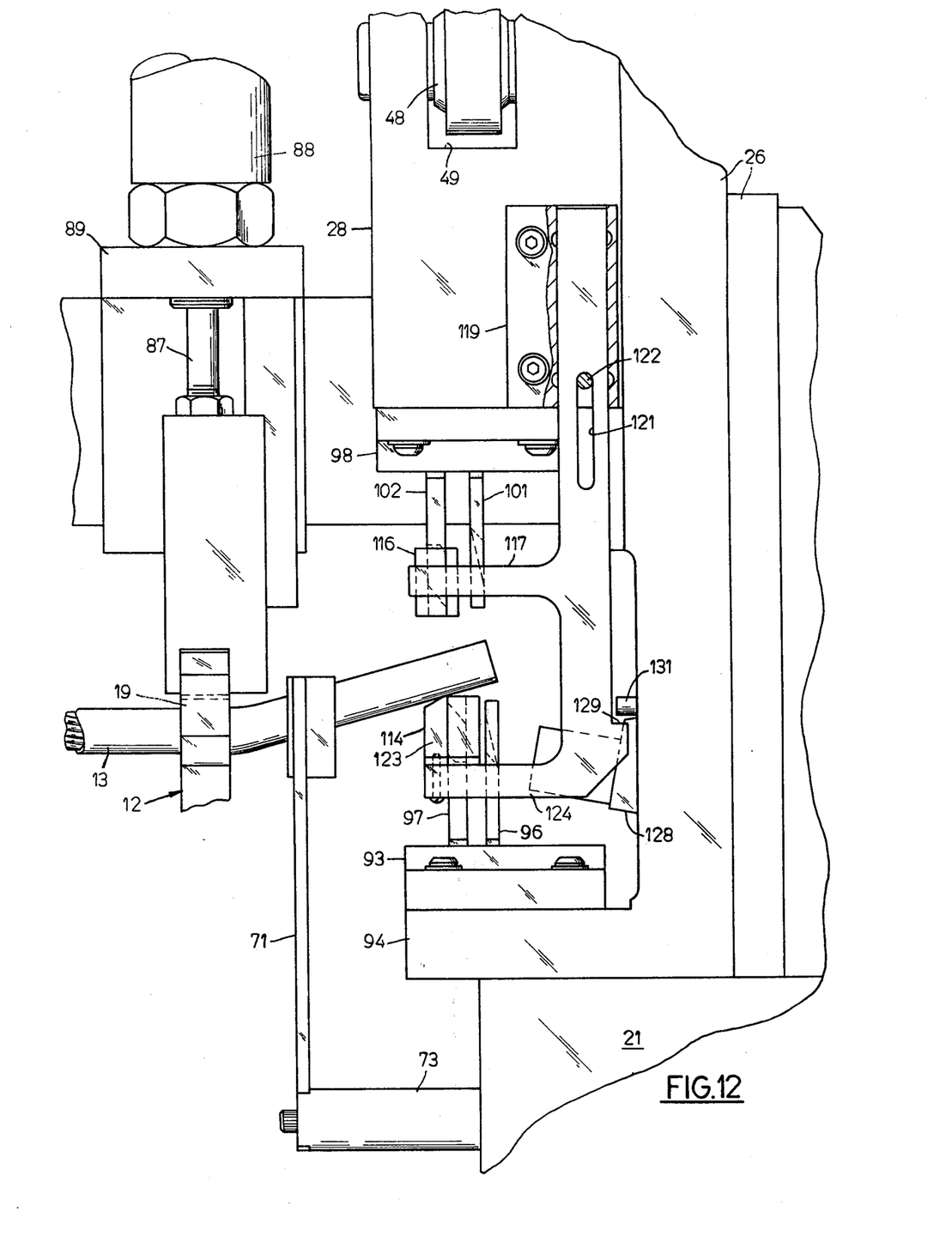
FIGS. 12 through 19 are schematic views illustrating various phases of operation of the apparatus shown in FIG. 3.

In addition to providing a knock-out member, the trapezoidal lower cross bar 114 also provides a ramp for guiding the overhanging end of a wire 13 laterally into the space between the open pairs of wire cutting blades 96, 101 and wire stripping blades 97, 102. While the conveyor mechanism 8 is at rest, the wire centering fingers 69, 71 (FIG. 7) are spread apart and leave an unobstructed path of lateral movement for the overhanging end of a wire 13 toward the projected tool slide 26. When the conveyor mechanism 8 advances from one indexed position to the next, the overhanging end of a wire 13 moving laterally toward the tool slide encounters the inclined ramp face 123 (FIG. 7) of the cross bar 114, and while the overhanging wire end ascends the ramp face 123 it is deflected upwardly as illustrated by FIG. 12. At the same time the centering fingers 69, 71 (FIG. 7) are moved toward each other, and when the conveyor stops the upwardly deflected end of the wire 13 will have been placed into a lateral accurately centered position relative to the open wire cutting and insulation stripping blades by the closing movement of the centering fingers 69 and 71.

FIG. 12 illustrates the vertical position which is occupied by the knock-out frame 114, 116, 117, 118 when the crosshead 28 is in its raised FIG. 8 position. In the FIG. 12 position of the knock-out frame the upper end of the slot 121 in the side member 117 bears against the pin 122 of the crosshead 28 and the knock-out frame is thereby kept in a raised position in which the bottom prong 124 of the side member 117 and the corresponding bottom prong of the side member 118 are spaced from the sole plate 94 of the tool slide 26.

Figure 10:
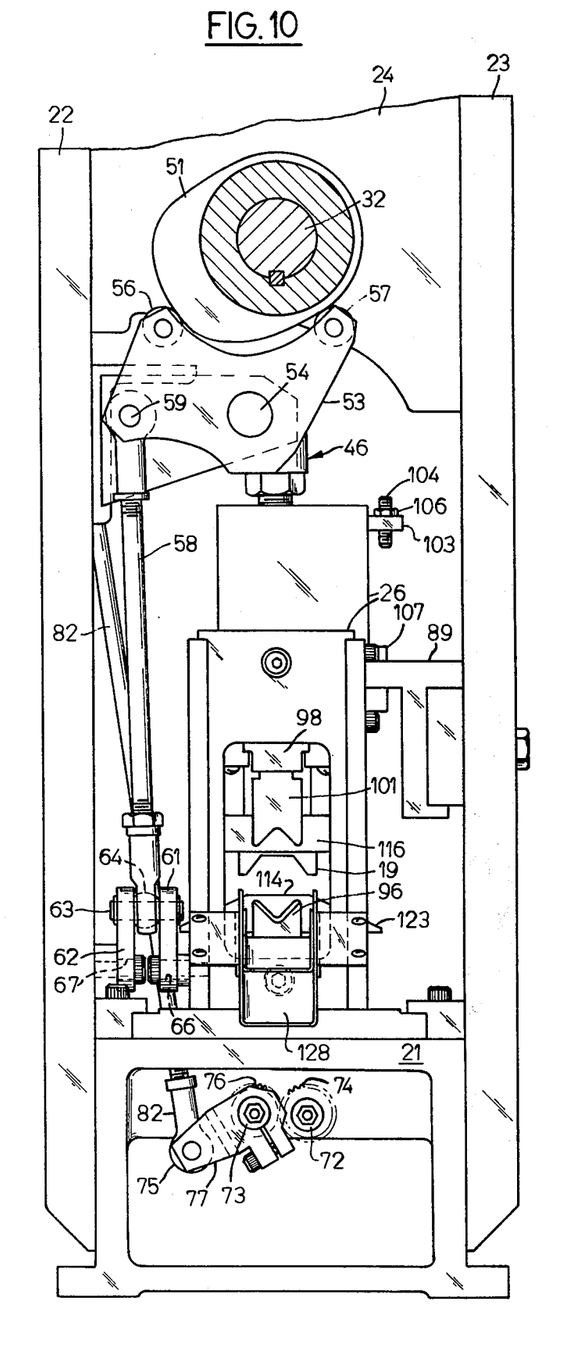
FIG. 10 is an elevational rear view of the apparatus shown in FIG. 3, the view being taken generally on line 10—10 of FIG. 5.
Figures 13, 14, 15:
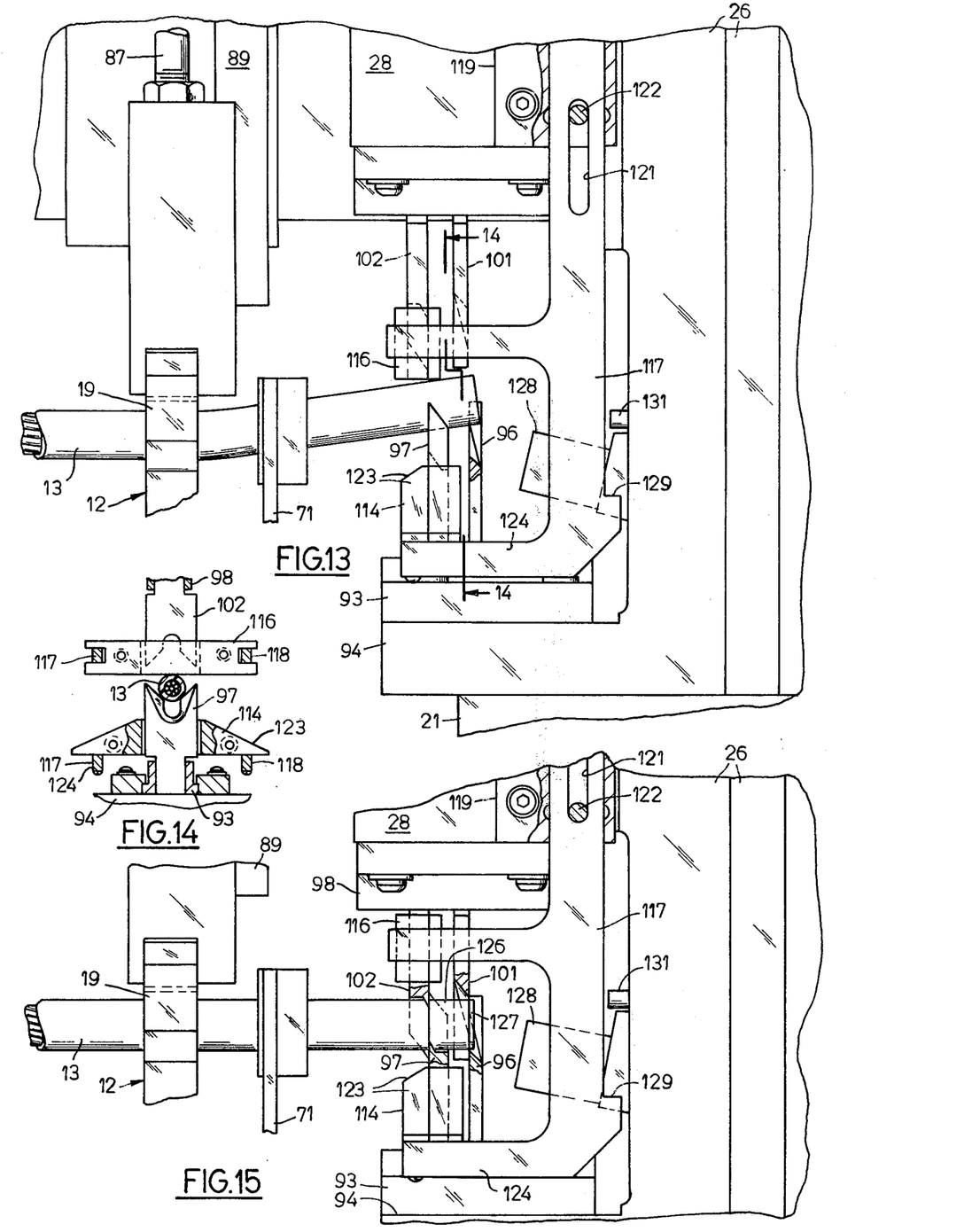

FIG. 13 shows the position to which the knock-out frame is lowered when the overhanging end of a wire 13 comes to rest on the V-shaped cutting edge of the stationary cutting blade 96 (FIG. 10). In the FIG. 13 position of the knock-out frame the upper cross bar 116 rests on the portion of the overhanging wire end which is straddled by the stationary stripping blade 97 as shown by FIG. 14.

FIG. 15 shows the position to which the knock-out frame is lowered by a full cutting stroke of the reciprocable blade assembly 98, 101, 102. The knock-out frame now bottoms on the blade assembly 93; the cutting edges of the stationary blades 96, 97 are cleared by the lower cross bar 114; and the cutting edges of the reciprocable blades 101, 102 are cleared by the upper cross bar 116.

Figure 16:
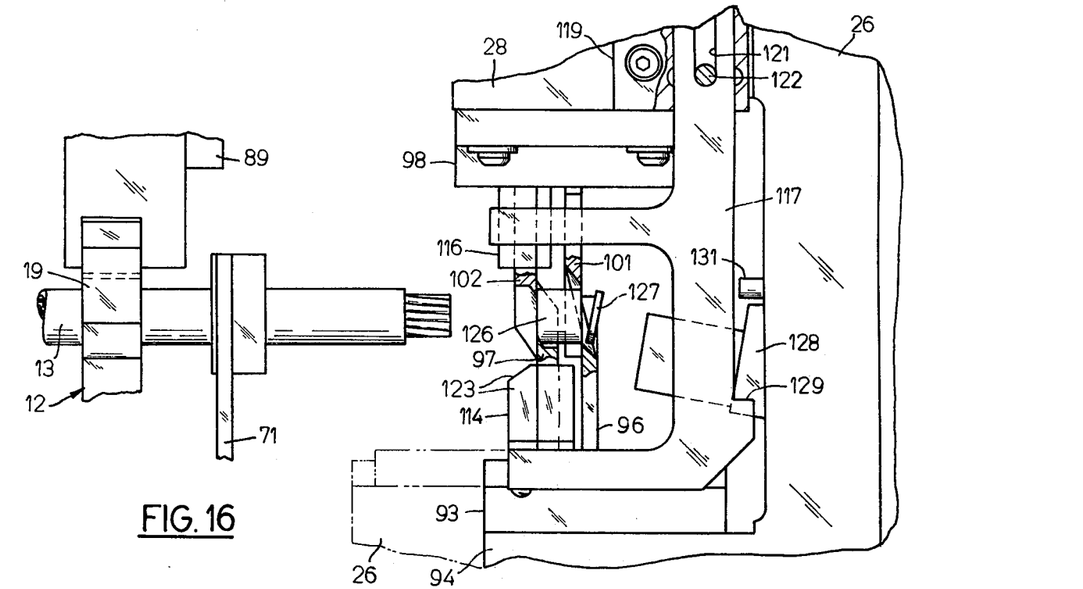

FIG. 16 shows the knock-out frame in the same position on the tool slide as FIG. 15, but the tool slide itself is shown in full lines in its retracted position, the projected FIG. 15 position of the tool slide being indicated by dotted lines in FIG. 16. The stripped insulation sleeve 126 which has been pulled from the overhanging end of the wire 13 by the stripping stroke of the tool slide, as shown in FIG. 16, is wedged at its upper half between the reciprocable blades 101, 102 and at its lower half between the blades 101 and 97. The waste portion 127 which has been trimmed from the overhanging wire end 13 by the coaction of the cutting blades 96, 101 may be blown by an air nozzle, not shown, into a discharge chute 128 on the main frame.

Figure 17:
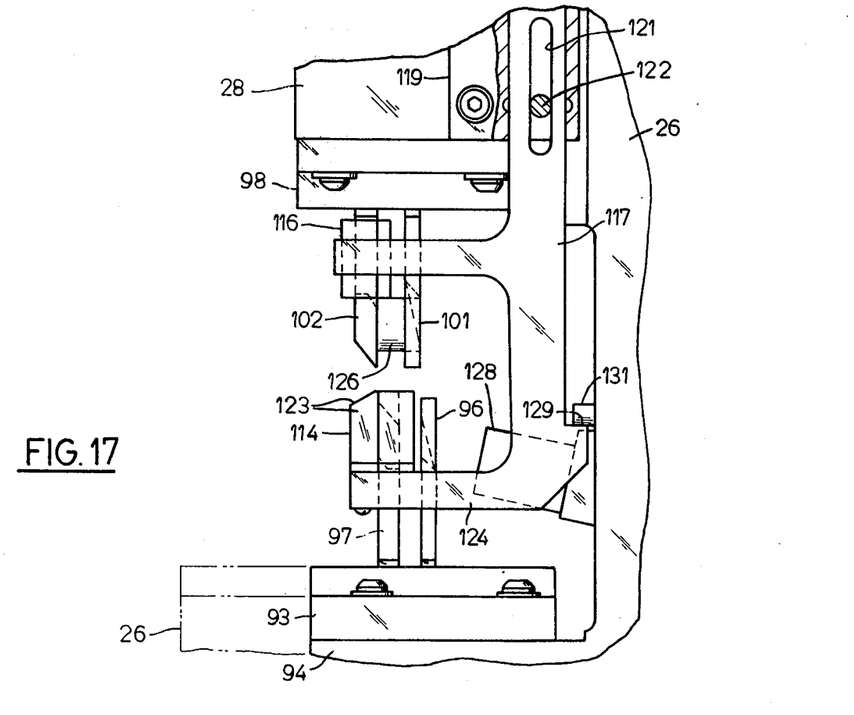

FIG. 17 shows the knock-out frame in a lifted position to which it may be raised while the crosshead 28 moves upward and the wedged insulation sleeve 126 between the blades 101, 102 bears against the underside of the upper cross bar 116. A stop pin 131 on the tool slide is engageable by a shoulder 129 of the knock-out frame in order to limit upward movement of the knock-out frame relative to the tool slide.

Figure 18:
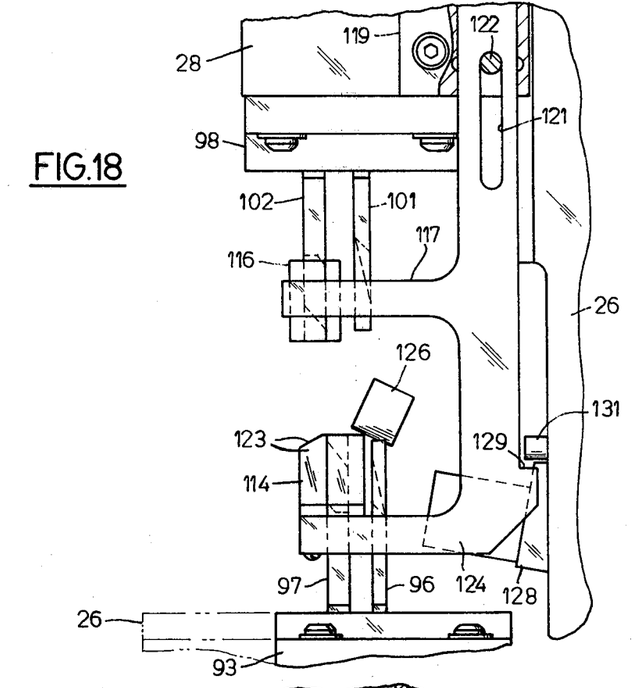

FIG. 18 shows the knock-out frame in substantially the same raised position on the tool slide as FIG. 17, and the crosshead 28 is shown raised from its FIG. 17 position to a lifted position corresponding substantially to the top dead center position of the crank pin 36 shown in FIG. 8. As a result of the upward movement of the crosshead 28 from its FIG. 17 position to its FIG. 18 position, and the consequent upward movement of the stripping blade 102 through the upper cross bar 116 the stripped insulation sleeve 126 has become dislodged from the blades 101, 102 as shown in FIG. 18.

In the event that the insulation sleeve 126 stays in the jammed condition between the stationary blades 96, 97 when the crosshead 28 is lifted from its FIG. 16 position by rotation of the crank pin 36 from its bottom dead center position to its top dead center position, the knock-out frame will initially remain in its lowered FIG. 16 position. As the crosshead 28 rises, the pin 122 will slide upward in the slot 121 and when it engages the upper end of the slot 122 continued upward movement of the crosshead 28 will lift the knock-out frame from its FIG. 16 to its FIG. 17 position. Obviously, such upward movement of the knock-out frame will dislodge the sleeve 126 from the stationary blades 96, 97.

Figure 19:
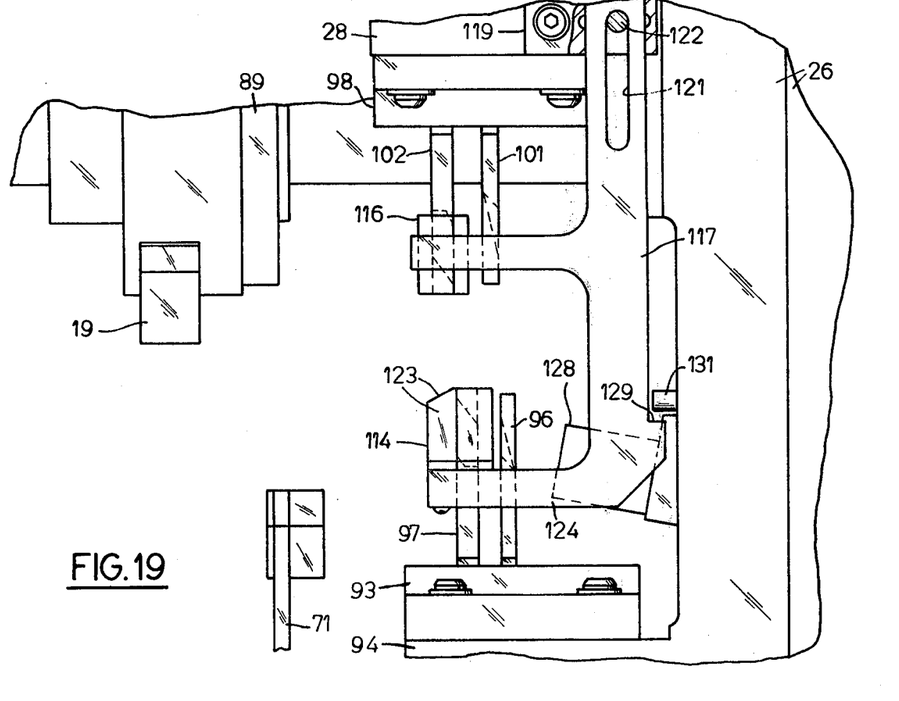

FIG. 19 shows the relative position of the tool slide 26, crosshead 28 and knock-out frame after the tool slide has been restored to its projected position and the trimmed and stripped wire 13 has been moved laterally out of the wire cutting and stripping apparatus 1 by advance movement of the conveying mechanism 8. The FIG. 19 position of the knock-out frame is the same as its FIG. 12 position, and the lower cross bar 116 is in position to guide the overhanging end of the next wire 13 laterally into the open pairs of wire cutting and insulation stripping blades.

From a general point of view, the tool slide 26 affords a support on which a stationary assembly of wire cutting and stripping blades, and a reciprocable assembly of complimentary wire cutting and insulation stripping blades are mounted in cooperative relation to each other. The lower and upper cross members 114, 116 of the knock-out frame afford stripped insulation knock-out members which are reciprocably associated, respectively, with said stationary and reciprocable blade assemblies. The side members 117, 118 of the knock-out frame afford mounting means for the knock-out members which are guided for back and forth movement in the same direction in which the reciprocable blade assembly is movable relative to the stationary blade assembly; and the slot 121 and pin 122 afford lost motion connecting means which are operatively interposed between the reciprocable blade assembly and the knock-out members 114 and 116.

The sole plate 94 of the tool slide carries a stop means 93 which is abuttable by the knock-out frame 114 to limit movement of the latter in the direction of a cutting stroke of the reciprocable blade assembly 98.

The stop pin 131 (FIG. 12) on the tool slide provides a stop means which is abuttable by the knock-out frame so as to limit movement of the latter in the direction of a retracting stroke of the reciprocable blade assembly.

OPERATING CYCLE

Figure 20:
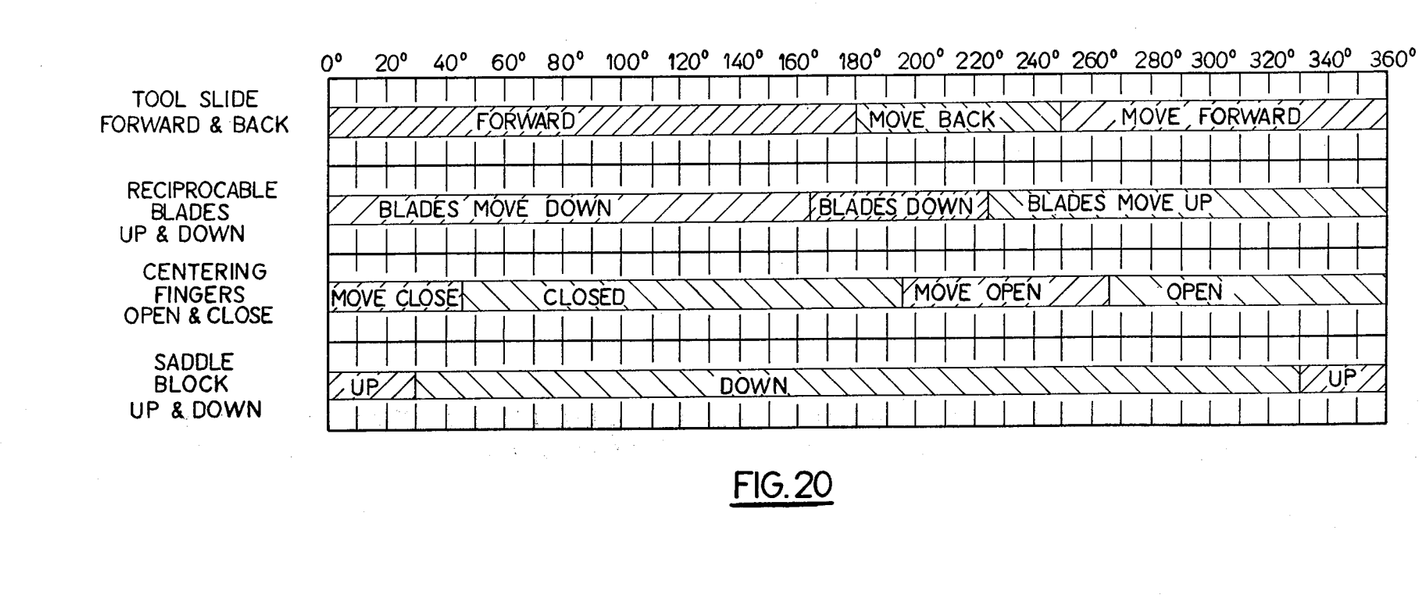
FIG. 20 is a chart showing the movement of the various units as plotted for one cycle of operation.

The rotatively adjusted position of the crank shaft 32 which places the crank pin 36 into its FIG. 8 position determines the starting position of the crank shaft. As illustrated by FIG. 20, the straddle block 19 (FIG. 2) is kept in its raised FIG. 5 position while the crank shaft 32 rotates 30° from its starting position in the direction of arrow 44 in FIG. 8. While the crank shaft continues to rotate from its 30° position to its 330° position the straddle block is kept down in its conveyor clamp tightening position (FIG. 1) by air pressure in the cylinder 88; and while the crank shaft 32 continues to rotate from its 330° position to its 360° position the straddle block 19 is kept in its raised FIG. 5 position.

The centering fingers 69, 71 (FIG. 7) move from their wire clearing position to their wire embracing position while the crank shaft 32 rotates 45° from its starting position. Continued rotation of the crank shaft from its 45° position to its 195° position leaves the centering fingers in their wire embracing position; further rotation of the crank shaft from its 195° position to its 265° position restores the centering fingers to their wire clearing position; and final rotation of the cam shaft from its 265° position to its 360° position leaves the centering fingers in their wire clearing position.

The reciprocable blades 101, 102 move from their raised FIG. 8 position to their lowered FIG. 9 position while the crank shaft rotates 165° from its starting position. Continued rotation of the crank shaft from its 165° position to its 225° position leaves the reciprocable blades in their lowered position due to expansion of the telescopic link 46; and continued rotation of the crank shaft 32 from its 225° position to its 360° position restores the reciprocable blades to their fully raised FIG. 8 position.

The tool slide 26 is kept in its projected FIG. 5 position while the crank shaft 32 rotates 180° from its starting position. Continued rotation of the crank shaft from its 180° position to its 250° position retracts the tool slide for a stripping stroke; and final rotation of the crank shaft from its 250° position to its 360° position restores the tool slide to its projected FIG. 5 position.

The dwell period during which the reciprocable blades 101, 102 stay in their lowered FIG. 9 position while the crank shaft continues to rotate develops in the time interval in which the crank shaft rotates from its 165° position to its 225° position. During that time interval, as shown by FIG. 20, the tool slide moves back for a stripping stroke and the straddle block 19 bears down on the underlying jaws of the conveyor clamp 12, whereby the jaws of the clamp are tightened sufficiently to prevent axial slip of the wire 13 under the stripping pull of the tool slide.

I claim:

1. An insulated wire cutting and stripping apparatus for use in connection with an intermittently operable wire conveying mechanism, said apparatus comprising a stationary main frame positioned opposite to and at a fixed spacing from one side of said conveying mechanism; a tool slide reciprocably mounted on said main frame for movement into projected and retracted positions relative to said conveying mechanism; wire cutting and insulation stripping blades fixedly mounted on said tool slide, complementary wire cutting and insulation stripping blades reciprocably mounted on said tool slide in cooperative relation to said fixedly mounted wire cutting and insulation stripping blades; a crank shaft rotatably mounted on said main frame; a telescopically contractable and expandable connecting rod universally connected at one end thereof with said crank shaft; supporting means for said reciprocably mounted wire cutting and insulation stripping blades universally connected with the other end of said connecting rod, and resilient means operatively associated with said connecting rod for urging it into an expanded condition.

2. An insulated wire cutting and stripping apparatus as set forth in claim 1, and further comprising tightening means cooperable with wire gripping jaws of said conveying mechanism during movement of said tool slide into said retracted position thereof, said tightening means comprising a thrust transmitting element mounted on said main frame for reciprocating movement into and out of cooperative engagement with said wire gripping jaws.

3. An insulated wire cutting and stripping apparatus as set forth in claim 2, wherein an expandable and contractable cylinder and piston unit on said main frame is operatively connected with said thrust transmitting element for moving the latter into and out of cooperative engagement with said wire gripping jaws.

4. An insulated wire cutting and stripping apparatus as set forth in claim 1 and further comprising a ramp member for guiding a wire laterally through the space between said fixedly and reciprocably mounted cutting and stripping blades while said reciprocably mounted blades are retracted on said tool slide from said fixedly mounted blades; means reciprocably mounting said ramp member for lateral back and forth movement in the direction of movement of said reciprocably mounted blades relative to said tool slide; and actuating means for reciprocating said ramp member in said direction of movement thereof.

5. An insulated wire cutting and stripping apparatus as set forth in claim 4, wherein said ramp member has a through passage accommodating said fixedly mounted stripping blade on said tool slide.

6. An insulated wire cutting and stripping apparatus as set forth in claim 4 and further comprising centering means for laterally aligning said wire with said fixedly and reciprocably mounted cutting and stripping blades on said tool slide preparatory to a cutting stroke of said reciprocably mounted blades.

7. An insulated wire cutting and stripping apparatus as set forth in claim 6, wherein said centering means comprise a pair of complementary wire engaging fingers pivotally mounted on said main frame for relative back and forth movement laterally of said wire.

8. In an insulated wire cutting and stripping apparatus, the combination of a main frame; a stationary assembly of wire cutting and stripping blades, and a reciprocable assembly of complementary wire cutting and insulation stripping blades mounted on said main frame in cooperative relation to each other, stripped insulation knock-out members reciprocably associated, respectively, with said stationary and reciprocable blade assemblies; and actuating means for said knock-out members operatively connected with said reciprocable blade assembly.

9. In an insulated wire cutting and stripping apparatus, the combination of a support; a stationary assembly of wire cutting and stripping blades, and a reciprocable assembly of complementary wire cutting and insulation stripping blades mounted on said support in cooperative relation to each other; stripped insulation knock-out members reciprocably associated, respectively, with said stationary and reciprocable blade assemblies; mounting means for said knock-out members guided for back and forth movement in the same direction in which said reciprocable blade assembly is movable relative to said stationary blade assembly; and lost motion connecting means operatively interposed between said reciprocable blade assembly and said knock-out members, whereby a stripped insulation sleeve lodged between said wire cutting and insulation stripping blades of either said stationary or of said reciprocable blade assembly will be dislodged upon retracting movement of said reciprocable blade assembly from said stationary blade assembly.

10. In an insulated wire trimming and insulation stripping apparatus, the combination of a support; a stationary blade assembly comprising a wire cutting blade and an insulation stripping blade, and a reciprocable blade assembly comprising a complementary wire cutting blade and a complementary insulation stripping blade mounted on said main frame in cooperative relation to said stationary blade assembly; a stripped insulation knock-out frame guided for back and forth movement in the same direction in which said reciprocable blade assembly is movable relative to said stationary blade assembly; said knock-out frame having a pair of transversely spaced cross members, one positioned between said wire cutting and insulation stripping blades of said stationary blade assembly, and the other positioned between said wire cutting and insulation stripping blades of said reciprocable blade assembly; and lost motion connecting means operatively interposed between said reciprocable blade assembly and said knock-out frame whereby a stripped insulation sleeve lodged between said wire cutting and insulation stripping blades of either said stationary or of said reciprocable blade assembly will be dislodged upon retracting movement of said reciprocable blade assembly from said stationary blade assembly.

11. The combination set forth in claim 10 and further comprising stop means on said support abuttable by said knock-out frame so as to limit movement of the latter in the direction of a cutting stroke of said reciprocable blade assembly.

12. The combination set forth in claim 10 and further comprising stop means on said support abuttable by said knock-out frame so as to limit movement of the latter in the direction of a retracting stroke of said reciprocable blade assembly.

* * * * *